(12) United States Patent
Kim et al.

(10) Patent No.: US 8,923,549 B2
(45) Date of Patent: Dec. 30, 2014

(54) WATERMARK GENERATING METHOD, BROADCAST CONTENT GENERATING METHOD INCLUDING THE SAME AND WATERMARKING SYSTEM

(75) Inventors: Younhee Kim, Daejon (KR); Jeho Nam, Daejeon (KR); Hyuntae Kim, Seoul (KR); Inje Cho, Seoul (KR); Kihyeok Bae, Seoul (KR); Jea-Seung Jeong, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 463 days.

(21) Appl. No.: 13/306,485

(22) Filed: Nov. 29, 2011

(65) Prior Publication Data
US 2012/0134510 A1    May 31, 2012

(30) Foreign Application Priority Data

Nov. 29, 2010  (KR) .................. 10-2010-0119955
Jun. 30, 2011  (KR) .................. 10-2011-0064316

(51) Int. Cl.
*G06K 9/00*     (2006.01)
*H04N 21/8358*  (2011.01)

(52) U.S. Cl.
CPC ................................ *H04N 21/8358* (2013.01)
USPC ......................................... 382/100; 713/176

(58) Field of Classification Search
USPC ............... 382/100, 232; 713/176; 358/426.16
See application file for complete search history.

(56) References Cited

U.S. PATENT DOCUMENTS

| | | | |
|---|---|---|---|
| 6,700,989 B1* | 3/2004 | Itoh et al. ....................... | 382/100 |
| 7,058,201 B2* | 6/2006 | Mayboroda et al. ........... | 382/100 |
| 7,191,334 B1* | 3/2007 | Kalker ........................... | 713/176 |
| 2003/0174858 A1* | 9/2003 | Kim et al. ...................... | 382/100 |
| 2005/0105763 A1* | 5/2005 | Lee et al. ....................... | 382/100 |
| 2006/0188129 A1* | 8/2006 | Mayboroda et al. ........... | 382/100 |
| 2007/0165851 A1* | 7/2007 | Roberts .......................... | 380/201 |
| 2007/0220575 A1* | 9/2007 | Cooper et al. ................. | 725/118 |
| 2008/0273851 A1* | 11/2008 | Dragic ........................... | 385/127 |
| 2009/0290711 A1 | 11/2009 | Bloom et al. | |
| 2009/0310817 A1* | 12/2009 | Park et al. ...................... | 382/100 |
| 2010/0214307 A1* | 8/2010 | Lee et al. ....................... | 345/581 |
| 2010/0215342 A1* | 8/2010 | Lee et al. ....................... | 386/95 |

FOREIGN PATENT DOCUMENTS

| | | |
|---|---|---|
| KR | 1020050046383 | 5/2005 |
| KR | 10-2007-0073839 | 7/2007 |
| KR | 10-2009-0099844 | 9/2009 |
| KR | 10-2009-0104349 | 10/2009 |
| KR | 10-2010-0021588 | 2/2010 |

* cited by examiner

*Primary Examiner* — Samir Ahmed
(74) *Attorney, Agent, or Firm* — Nelson Mullins Riley & Scarborough LLP; Anthony A. Laurentano, Esq.

(57) ABSTRACT

Disclosed are a method of generating a watermark, a method of generating a broadcast content including the same, and a watermarking system. The method of generating a watermark according to an exemplary embodiment of the present disclosure includes: determining a size of a target image to which a broadcast content is provided; determining the number of watermarks to be inserted into one frame of the target image; generating a watermark insert pattern by using the size of the target image and the number of watermarks; and scaling up the watermark insert pattern to a predetermined pattern for inserting the watermark insert pattern into an original image of the broadcast content.

9 Claims, 5 Drawing Sheets

WATERMARK GENERATING METHOD, BROADCAST CONTENT GENERATING METHOD INCLUDING THE SAME AND WATERMARKING SYSTEM

CROSS-REFERENCE TO RELATED APPLICATIONS

This application is based on and claims priority from Korean Patent Application No. 10-2010-0119955, filed on Nov. 29, 2010, and Korean Patent Application No. 10-2011-0064316, filed on Jun. 30, 2011, with the Korean Intellectual Property Office, the present disclosure of which is incorporated herein in its entirety by reference.

TECHNICAL FIELD

The present disclosure relates to a method of generating a watermark, a method of generating a broadcast content including the same, and a watermarking system for inserting the generated watermark into the broadcast content.

BACKGROUND

As a digital broadcast is invigorated, a high-quality broadcast content which is not viewed in an analog broadcast is increased. In addition, various watching forms which support the high-quality broadcast by a computer, a mobile phone, and the like based on an internet as well as a known TV receiver have been gradually increased. Viewers can store various broadcast contents in a computer with the same image quality as an original or modify the stored contents due to the various viewing forms. The broadcast contents of the stored digital forms may be simply copied in large amounts without the damage of the image quality unlike the analog form and some of the contents put in circulation illegally to unspecified individuals through various internet sites, a web-hard, or the like.

A watermarking technology is used in order to prevent the illegal circulation and induce a legal contents consumption. The watermarking technology is to prevent an illegal copy of the digital contents and protect a copyright for the digital contents by inserting personal identification information of makers thereof into the broadcast contents.

As an example of the watermarking technology, a method, in which a Universal Content Identifier (UCI) code is inserted in the image of the broadcast contents by being hidden so as to elude observation, is used. The UCI means a system of granting a unique code for an individual resource in order to efficiently circulate and utilize an identifiable resource and managing the code or a link standard between different identifiers. The hidden identifier (UCI) may be used to limit the usage of the contents by detecting the illegal copy and circulation of the contents and also, may be widely used to facilitate a legal purchase of pay contents and provide various link type services.

In the present, a Full HD level broadcast contents transmitted from each broadcasting station has an image size (resolution) of 1920×1080 and the viewers can view the high-quality image through a digital TV in a home. However, recently, as consumption types of the broadcasting contents are gradually changed, the case, where the viewers select and view a desired broadcast in a desired time through an online VOD service or a steaming service such as a Youtube after broadcasting rather than view a real-time broadcast through the TV, is gradually increased. Due to the nature of the circulation process of the broadcasting contents, various types of modifications are applied to the contents, but when the modified contents are able to be identified by an initial-granted identifier (UCI), the contents can be efficiently identified and managed.

Therefore, a method of generating the watermark, which is strong on various modifications so as to detect an effective watermark although a form of a codec, a size, an edition, or the like of the transmitted broadcasting contents including a watermark is modified, and can minimize the deterioration in the image quality although the watermark is inserted into the original image, has been required.

SUMMARY

The present disclosure has been made in an effort to provide a method of generating a watermark and a broadcast content which is strong on various modifications so as to detect an effective watermark although a form of a codec, a size, an edition, or the like of the transmitted broadcasting contents including a watermark is modified, and can minimize the deterioration in the image quality of the watermark-inserted broadcast contents.

Further, the present disclosure has been made in an effort to provide a watermarking system capable of inserting the watermark in a real-time in the transmission of a Full HD level broadcast.

An exemplary embodiment of the present disclosure provides a method of generating a watermark, including: determining a size of a target image to which a broadcast content is provided; determining the number of watermarks to be inserted into one frame of the target image; generating a watermark insert pattern by using the size of the target image and the number of watermarks; and scaling up the watermark insert pattern to a predetermined pattern for inserting the watermark insert pattern into an original image of the broadcast content.

The generating of the watermark insert pattern may include: determining the size of the watermark insert pattern by using the size of the target image and the number of watermarks; determining a spread spectrum bit number by using the size of the watermark insert pattern and the size of the watermark; and generating the watermark insert pattern by applying a spread spectrum method using the bit number.

The scaling-up may include generating an expansion pattern so that the watermark insert pattern is inserted repetitively in an alphabet I or X pattern.

The watermark may include identifier information of the broadcast content, synchronization information for inserting the watermark, and an error correction code for increasing a detection rate of the watermark.

Another exemplary embodiment of the present disclosure provides a method of generating a broadcast content, including: generating a watermark insert pattern by using the size of a target image to which a broadcast content is provided and the number of watermarks to be inserted into one frame of the target image; scaling up the watermark insert pattern to a predetermined pattern for inserting the watermark insert pattern into an original image of the broadcast content; calculating a watermark inserting strength corresponding to each pixel of the original image; and inserting the scaled-up watermark insert pattern into the original image according to the watermark inserting strength.

When the original image is broadcasted, the scaled-up watermark insert pattern may be inserted into a part or all frames of the original image in real time.

Yet another exemplary embodiment of the present disclosure provides a watermarking system, including: an insert pattern generation unit generating a watermark insert pattern by using the size of a target image to which a broadcast content is provided and the number of watermarks to be inserted into one frame of the target image; an extension unit scaling up the watermark insert pattern to a predetermined pattern for inserting the watermark insert pattern into an original image of the broadcast content; and a watermark insertion unit calculating a watermark inserting strength corresponding to each pixel for each frame of the original image and inserting the scaled-up watermark insert pattern into the original image according to the watermark inserting strength in real time.

The insert pattern generation unit may include: an insertion pattern size determining part determining the size of the watermark insert pattern by using the size of the target image and the number of watermarks; and a spread spectrum part determining a spread spectrum bit number by using the size of the watermark insert pattern and the size of the watermark and generating the watermark insert pattern by applying a spread spectrum method using the bit number.

The watermark insertion unit may include an inserting strength calculation part calculating the watermark inserting strength corresponding to each pixel for each of a part or all frames of the original image in real time.

The inserting strength calculation part may be implemented by a multi-processor for dividing each frame of the original image into two or more subframes and processing the two or more frames in parallel.

According to the exemplary embodiments of the present disclosure, although a form of the transmitted broadcast contents is modified, a strong watermark and broadcast contents capable of detecting an effective watermark can be generated by expecting a modified form of the broadcast contents to generate a watermark insert pattern corresponding to the modified form.

Further, the watermark insert pattern is scaled-up in a form such as an alphabetic letter of I or X to be inserted at only some pixels, not all pixels of the original image, such that the deterioration in the image quality of the watermark-inserted broadcast contents can be minimized.

In addition, the watermark can be inserted into the broadcast contents in a real-time through a watermark inserting system using a multi-processor even in the transmission of a Full HD level broadcast.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
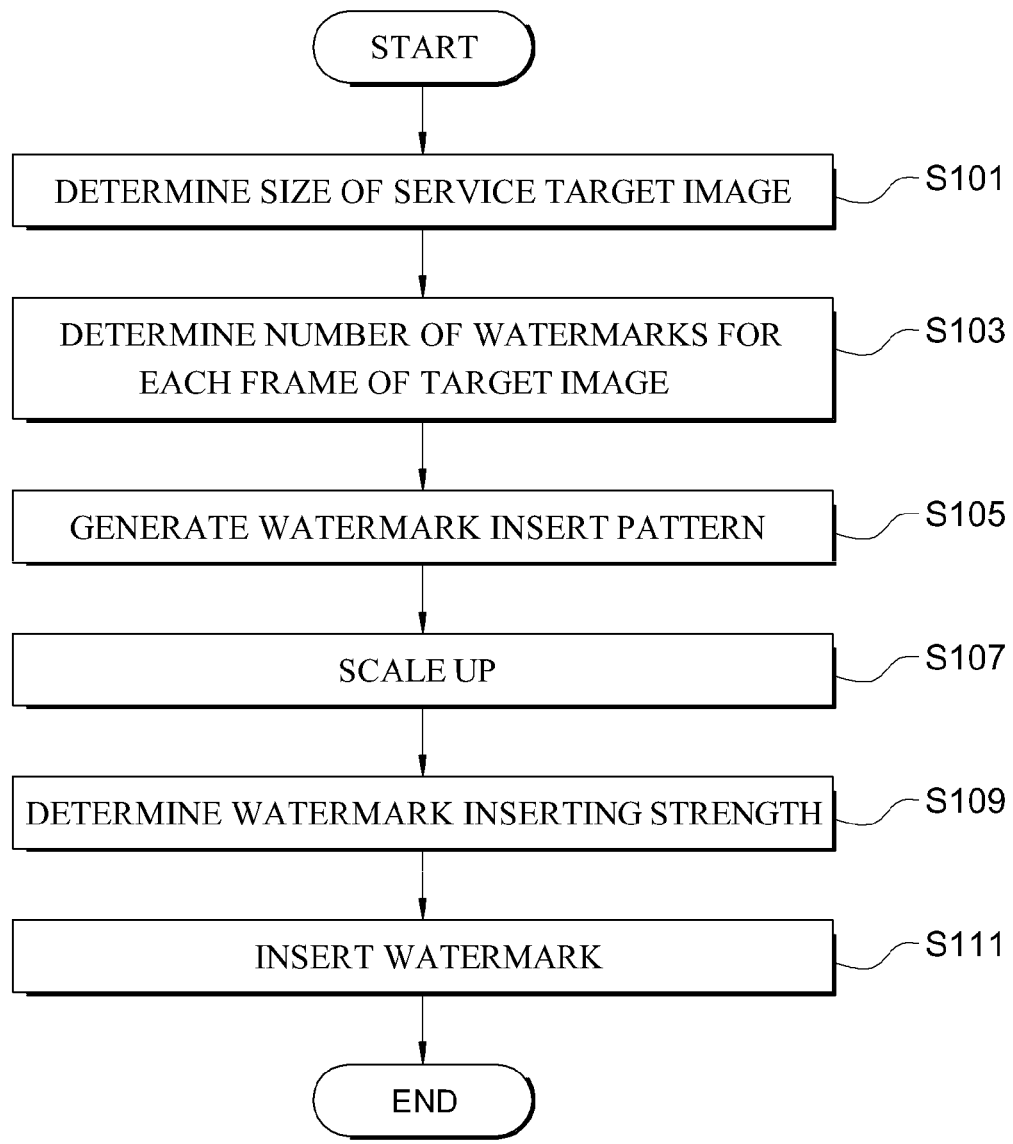
FIG. 1 is a flowchart of a method of generating a broadcast content according to an exemplary embodiment of the present disclosure.

FIG. 1 is a flowchart of a method of generating a broadcast content according to an exemplary embodiment of the present disclosure.

Referring to FIG. 1, a method of generating a broadcast content according to an exemplary embodiment of the present disclosure includes determining a size of a service target image (S101), determining a watermark number per a frame of the target image (S103), generating a watermark insert pattern (S105), scaling-up (S107), determining a watermark inserting strength (S109), and inserting a watermark (S111).

The 'watermark' may include identifier information for identifying a maker, a manager, a circulator/distributor, and the like of the broadcast content, synchronization information for the insertion, and an error correction code for increasing detection rate of the watermark. Herein, the identifier information may be a universal content identifier (UCI) code. The synchronization information means information recognizable as a resolution variation of images, a rotation ratio, or the like.

The determining of a size of a service target image (S101) determines a size of a service target image of the broadcast contents. For example, when a VOD service of the broadcast contents is provided, the size of the service target image in which a real VOD service is provided can be previously expected. Accordingly, the target image is an image in which the watermark inserted into an original image is expected to remain. When a Full HD level image of 1920×1080 is broadcast-transmitted, the image may be provided in various resolutions of 1280×720, 640×480, 400×300, and the like by re-encoding the image, in which is a size of the target image.

The determining of a watermark number per a frame of the target image (S103) determines the number of the watermark insert pattern to be repetitively inserted in one frame of the target image. Two or more of the watermark insert pattern may be repetitively inserted in one screen, in which although a part of the original image is cut in the modification of the broadcast contents, the watermark can be extracted.

In the generating of a watermark insert pattern (S105), the watermark insert pattern is generated by using the determined size of the target image and the determined number of the inserted watermark per a frame. Hereinafter, the generating of a watermark insert pattern will be described in detail with reference to FIGS. 2 and 3.

Figure 2:
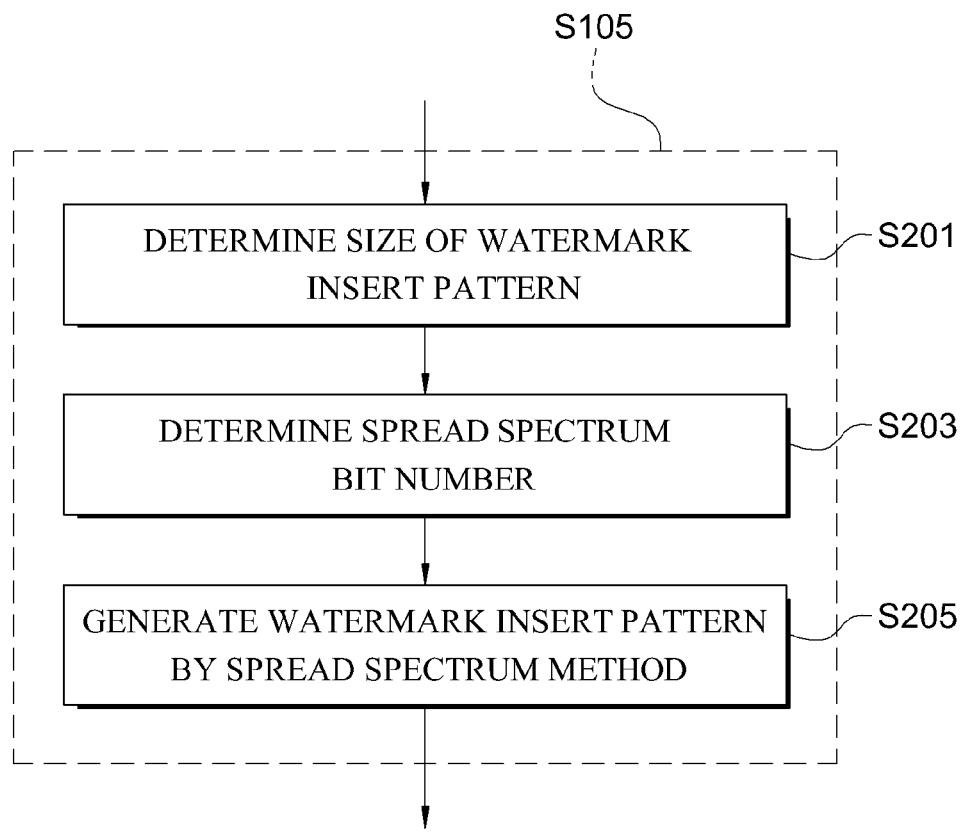
FIG. 2 is a flowchart illustrating generating a watermark insert pattern of FIG. 1 (S105) in more detail.
Figure 3A:
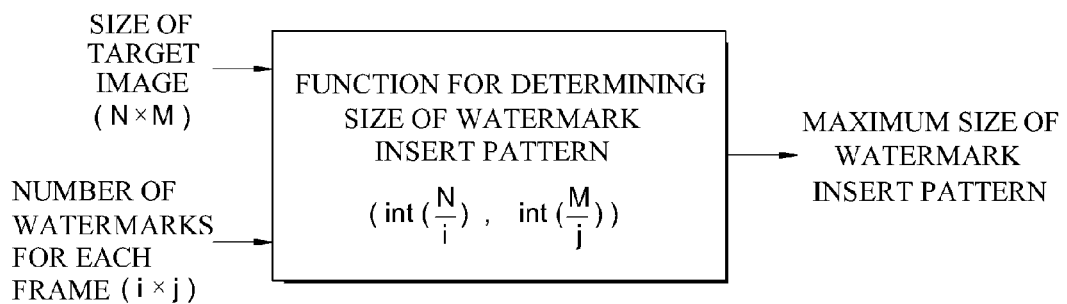
FIG. 3A is a diagram illustrating a method of calculating a maximum size of a watermark insert pattern.
Figure 3B:
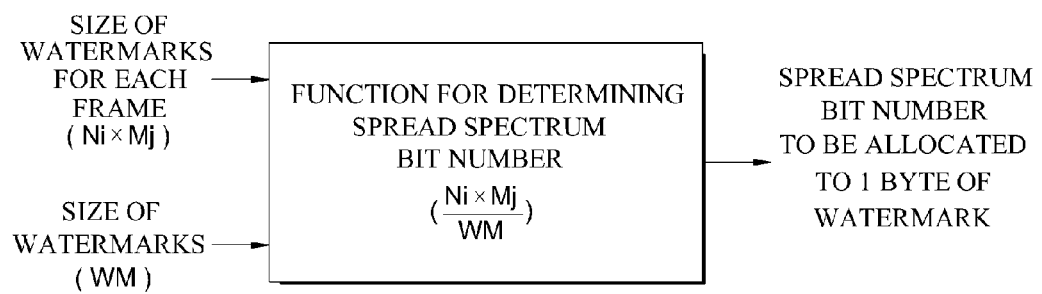
FIG. 3B is a diagram illustrating a method of calculating a spread spectrum bit number.

FIG. 2 is a flowchart illustrating generating a watermark insert pattern of FIG. 1 (S105) in more detail. FIG. 3A is a diagram illustrating a method of calculating a maximum size of a watermark insert pattern and FIG. 3B is a diagram illustrating a method of calculating a spread spectrum bit number.

Referring to FIG. 2, the generating of the watermark insert pattern (S105) may include determining a size of the watermark insert pattern (S201), determining a spread spectrum bit number (S203), and generating the watermark insert pattern by a spread spectrum method (S205).

According to the exemplary embodiment, a watermark inserting algorism represents effective information of the watermark of one bit by several bits by using the spread spectrum method and inserts the bit stream to be made in a 2D pattern, that is, a 2-dimensional array form. In this case, the watermark extraction and the image quality is largely influenced according to a method of forming the insert pattern.

Referring to FIG. 3A, a method of determining a maximum size of the watermark insert pattern is shown so as to reach robustness of the watermark depending on a desired resolution of a user by using a size determining function of the watermark insert pattern. The robustness of the watermark means a characteristic in that when the watermark is inserted to an important portion of a signal to be compressed for the transmission or the storage, the watermark is not broken and although a noise generated in the transmission or various kinds of modifications and impacts is applied, the inserted watermark can be extracted.

In the determining of the size of the watermark insert pattern (S201), as shown in FIG. 3A, a maximum size of the watermark insert pattern is calculated by using the determined size of the service target image and the number of the watermark to be inserted in one frame and the size of the watermark insert pattern is determined within the range smaller than the calculated maximum size. When the size of the target image is (N×M) and the number of the watermark per one frame is (i×j), a functional formula for calculating the maximum size of the watermark insert pattern is like the following Equation 1.

$$(int(N/i), int(M/j)) \quad \text{[Equation 1]}$$

Herein, an int( ) function means a function of removing a value below the decimal point and selecting only an integer value after performing the division.

Subsequently, in the determining of the spread spectrum bit number (S203), as shown in FIG. 3B, whether the spread spectrum bit number allocated in the watermark of 1 byte, that is, the effective information of 1 byte is spread-spectrum by several bits is determined by using the size of the watermark insert pattern and the size of the watermark. When the size of the watermark insert pattern is (Ni×Mj) and the size of the watermark is WM, the spread spectrum bit number allocated in the watermark of 1 byte is calculated by the following Equation 2.

$$(Ni \times Mj)/WM \quad \text{[Equation 2]}$$

As described above, the watermark insert pattern generated by the spread spectrum method has statistical characteristics such as an average of 0 and a distribution of 1. In addition, the correlation for the same watermark insert pattern is 1 and the correlation for different watermark insert patterns is 0.

In the scaling-up (S107), the generated watermark insert pattern is scaled-up in a predetermined form inserted in the original image of the broadcast content. The reason is because periodicity of a reference watermark is determined and detected when a geometric modification degree of the image is determined in a watermark detecting system. When the reference watermark is periodically inserted in the image without the scale-up, a maximum scope capable of expecting a downscale ratio of the image size is reduced up to a half of a length of an original signal. When the downscale is performed more than the maximum scope, the characteristic of the watermark insert pattern is restored at the original length by superposition between the signals and then, similarity is closed to 0, such that the watermark insert pattern cannot be restored like the original image by a method of measuring autocorrelation used in the detecting system.

Accordingly, the generated watermark insert pattern should be scaled-up in order to correspond to a maximum ratio in image size variation and when the size of the original image (W×H) and the size of the target image, that is, a minimum resolution is (N×M), the watermark insert pattern is scaled-up by (W/2N, H/2M) times to be inserted in the original image.

Figure 4:
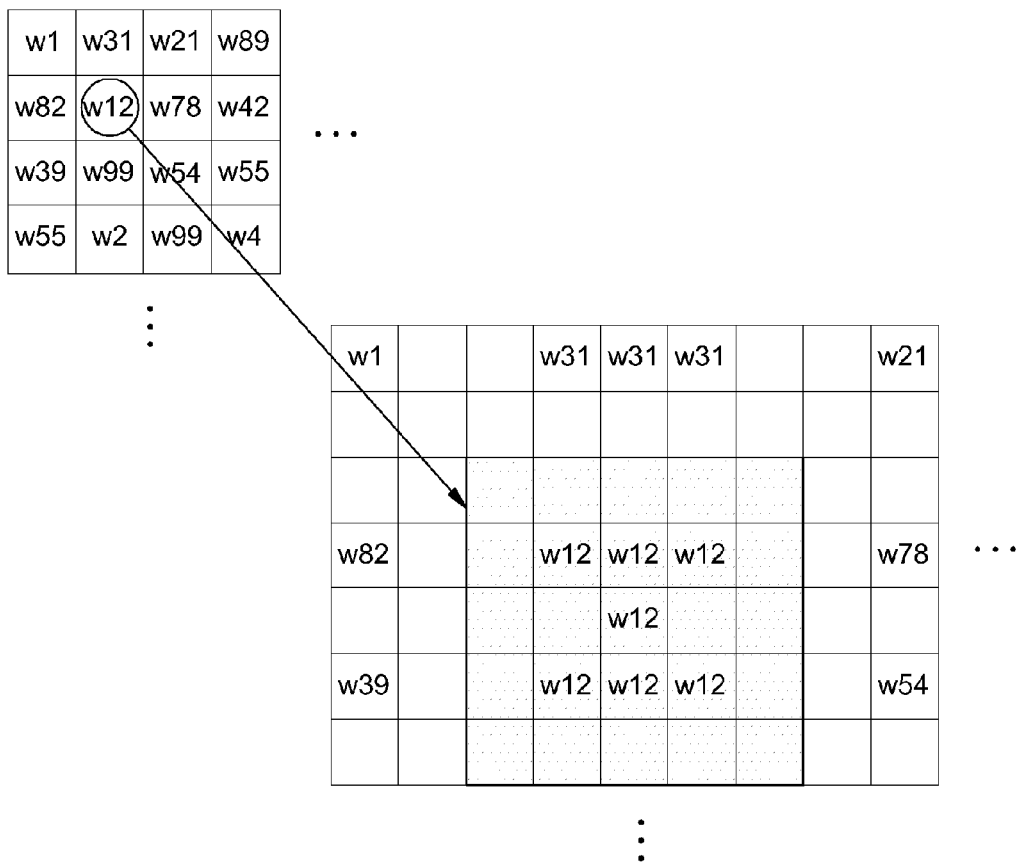
FIG. 4 is a diagram illustrating a scale-up form of a watermark insert pattern according to an exemplary embodiment of the present disclosure.

FIG. 4 is a diagram illustrating a scale-up form of a watermark insert pattern according to an exemplary embodiment of the present disclosure.

As shown in FIG. 4, in the exemplary embodiment, considering the image quality after inserting the watermark, all the pixels are not scaled-up and only some pixels are scaled-up. That is, the watermark insert pattern may be scaled-up by various forms such as an alphabetic letter of I or X form and a diamond form. Accordingly, the deterioration in the image quality of the original image can be minimized.

Next, in the determining of the watermark inserting strength (S109) and the inserting of the watermark (S111), the scaled-up watermark insert pattern is inserted by calculating the watermark inserting strength corresponding to each pixel of the original image and then, modifying a information value of the original image based on the calculated watermark inserting strength. In this case, when the original image is broadcast-transmitted in a real-time, the scaled-up watermark insert pattern may be inserted in a real-time into a part of the original image or all the frames. The method of calculating the inserting strength and inserting the watermark is widely known in the art, the detailed description will further be omitted.

Figure 5:
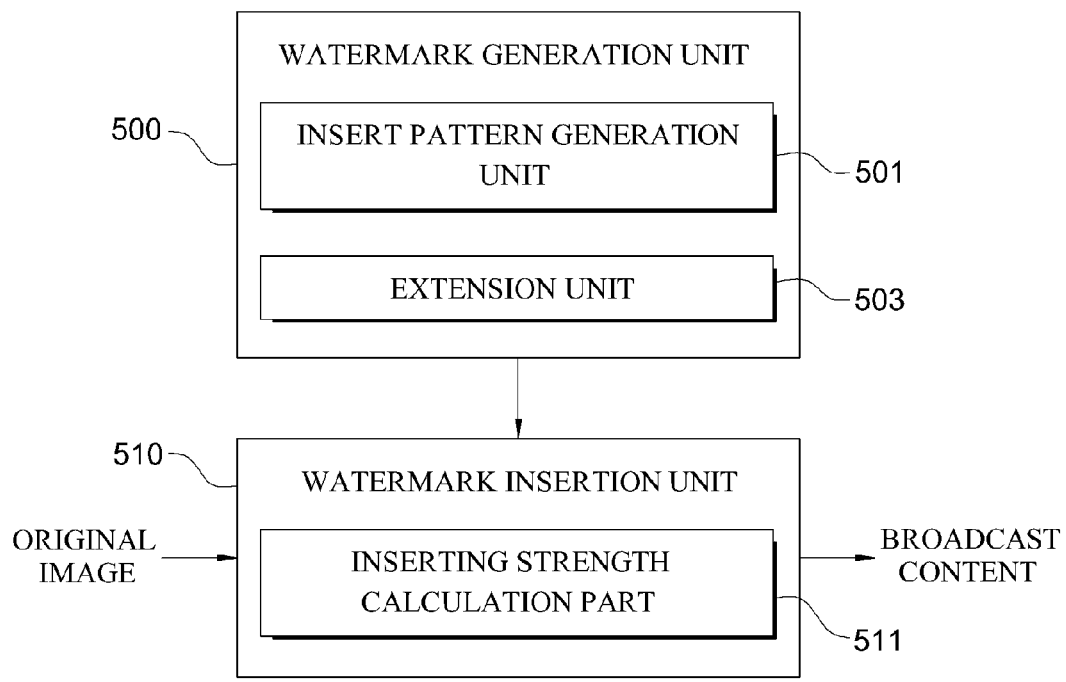
FIG. 5 is a configuration diagram illustrating a watermarking system according to an exemplary embodiment of the present disclosure.
Figure 6:
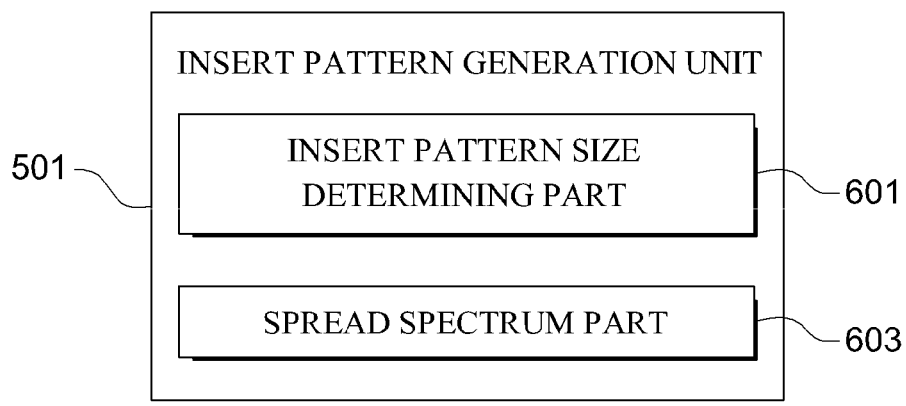
FIG. 6 is a configuration diagram illustrating a watermark insert pattern generating unit 501 of FIG. 5 in more detail.

FIG. 5 is a configuration diagram illustrating a watermarking system according to an exemplary embodiment of the present disclosure and FIG. 6 is a configuration diagram illustrating a watermark insert pattern generating unit 501 of FIG. 5 in more detail.

Referring to FIGS. 5 and 6, the system of inserting the watermark according to an exemplary embodiment of the present disclosure includes a watermark generation unit 500 and a watermark insertion unit 510.

The watermark generation unit 500 may include an insert pattern generation unit 501 and an extension unit 503. The insert pattern generation unit 501 generates the watermark insert pattern by using the size of the target image to have to service the broadcast contents and the number of the watermarks to be inserted in one frame of the target image. In detail, the insert pattern generation unit 501 may include an insert pattern size determining part 601 determining the size of the watermark insert pattern by using the size of the target image and the number of the watermarks to be inserted in one frame of the target image and a spread spectrum part 603 determining the size of the determined watermark insert pattern and the size of the water mark and generating the watermark insert pattern by applying the spread spectrum method.

The extension unit 503 may scale-up the watermark insert pattern in a predetermined form to be inserted into the original image of the broadcast contents. In detail, the method of generating and scaling-up the watermark insert pattern is the same as described in FIGS. 1 to 4.

The watermark insertion unit 510 may calculate the watermark inserting strength corresponding to each pixel per a frame of the original image and may insert the scaled-up watermark insert pattern into the original image in a real-time depending on the calculated watermark inserting strength. The watermark insertion unit 510 may include an inserting strength calculation part 511 calculating the watermark inserting strength corresponding to each pixel every some or all frames of the original image and the inserting strength calculation part 511 may be implemented by a multi-processor for dividing each frame of the original image into two or more sub-frames and parallel processing the sub-frames.

The system implemented in the exemplary embodiment may insert the identifier (UCI) information into all the Full HD level (1920×1080) images of 30 frames per second. In this case, all of a series of processes of acquiring an image in an HD-SDI signal, calculating the adaptive watermark inserting strength, inserting the watermark, and reconfiguring the image inserted with the watermark into the HD-SDI signal with respect to each 1920×1080 image should be able to be processed within 33 ms for enabling real-time processing without occurrence of the image delay.

Therefore, the watermark inserting system according to the exemplary embodiment is implemented by applying a multi-processing method to the adaptive watermark inserting strength calculating process which occupies most of the processes. That is, the watermark can be inserted in real time by applying a parallel processing method of a hardware (CPU) supporting a multi-processor.

Figure 7:
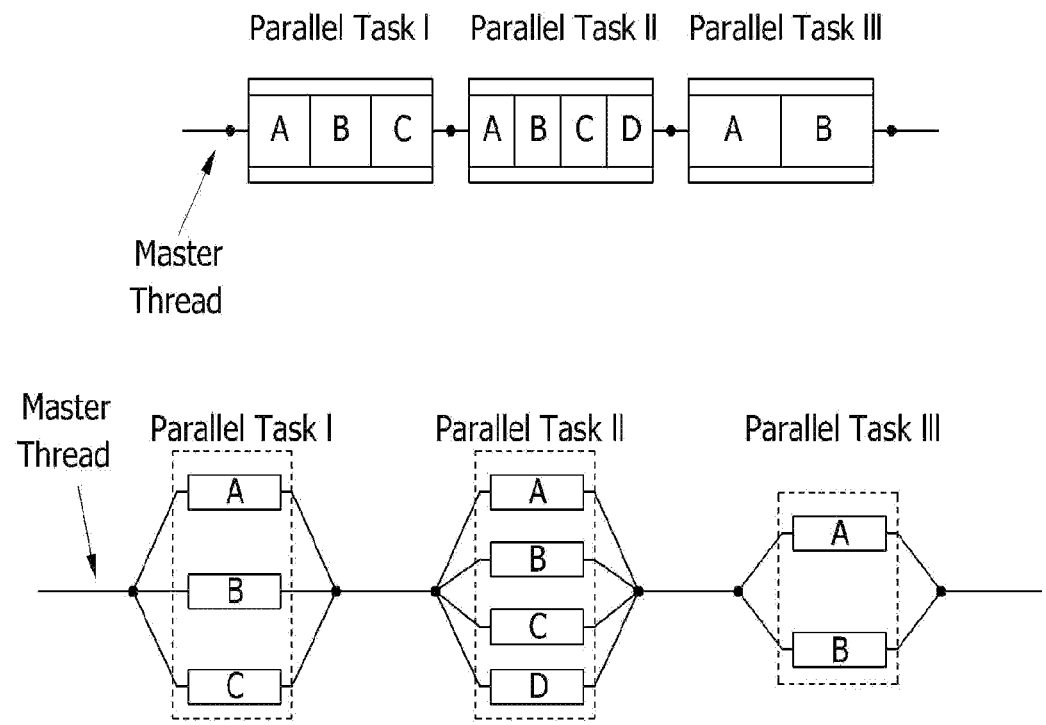
FIG. 7 is a diagram illustrating a parallel processing method of a watermarking system according to an exemplary embodiment of the present disclosure.

FIG. 7 is a diagram illustrating a parallel processing method of a watermarking system according to an exemplary embodiment of the present disclosure.

As shown in FIG. 7, when an operation which can be independently performed in each task within a master thread is separated and multi-processing is applied to the operation, A, B, and C operations of parallel task 1 generate threads as many as the number of CPU cores which can be internally provided in the hardware to be performed simultaneously. In this case, the final processing speed is dependent on an operation having the largest calculation amount among A, B, and C operations.

Specifically, each image frame having a size of 1920×1080 is divided into 8 images having a size of 1920×135 and each of the divided images is processed in parallel. Each of 8 images separates a section of open multi-processing (MP) and is independently processed as follows.

```
#pragma omp parallel
{
    #pragma omp sections
    {// First Calculation Watermark Weight
        #pragma omp section
        {
            Watermark_Weight_Generation( );
        }
        #pragma omp section
        {// 8th Calculation Watermark Weight
            Watermark_Weight_Generation ( );
        }
    }
}
```

In the system of the exemplary embodiment, the image is separated into 8 sections to be processed by using 8 multi-cores. In each separated image buffer, a boundary area should be separately processed so that other sections intrude into the corresponding boundary area.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of generating a watermark, comprising:
   determining a size of a target image to which a broadcast content is provided, wherein the target image is a geometric modification of an original image;
   determining the number of watermarks to be inserted into the target image;
   generating a watermark insert pattern by using the size of the target image and the number of watermarks; and
   scaling up the watermark insert pattern to a predetermined pattern for inserting into the original image.

2. The method of claim 1, wherein the generating of the watermark insert pattern includes:
   determining the size of the watermark insert pattern by using the size of the target image and the number of watermarks;
   determining a spread spectrum bit number by using the size of the watermark insert pattern and the size of the watermark; and
   generating the watermark insert pattern by applying a spread spectrum method using the spread spectrum bit number.

3. The method of claim 2, wherein if the size of the target image is (N×M) and the number of watermarks is (i×j), the size of the watermark insert pattern is determined in the range of the maximum size calculated by the following function, that is,
   (int(N/i), int(M/j)), wherein "int" is defined as a function of removing a value below a selected decimal point and selecting only an integer value after performing an arithmetic operation.

4. The method of claim 2, wherein if the size of the watermark insert pattern is (Ni×Mj) and the size of the watermark is WM, the spread spectrum bit number is calculated by the following equation, that is,
   (Ni×Mj)/WM.

5. The method of claim 1, wherein the scaling-up includes generating an expansion pattern so that the watermark insert pattern is inserted repetitively in an alphabet I or X pattern.

6. The method of claim 1, wherein the original image is a full-HD image having a size of 1920×1080.

7. The method of claim 1, wherein the target image has a size of 1280×720, 640×480, or 400×400 for a Video on Demand (VOD) service.

8. The method of claim 1, wherein the watermark includes identifier information of the broadcast content, synchronization information for inserting the watermark, and an error correction code for increasing a detection rate.

9. The method of claim 8, wherein the identifier information includes a universal content identifier (UCI) code.

* * * * *